Figure 1:
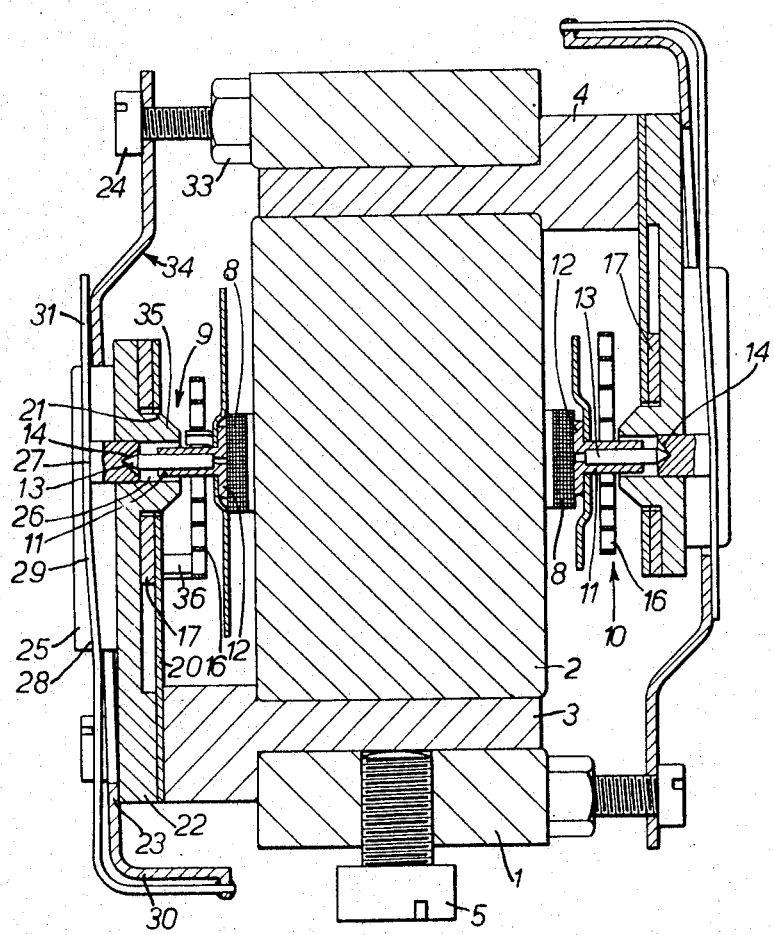

Jan. 17, 1967  H. S. MACADIE  3,298,758
INSTRUMENT BEARINGS AND INSTRUMENTS INCORPORATING SUCH BEARINGS
Filed April 29, 1964  2 Sheets-Sheet 2
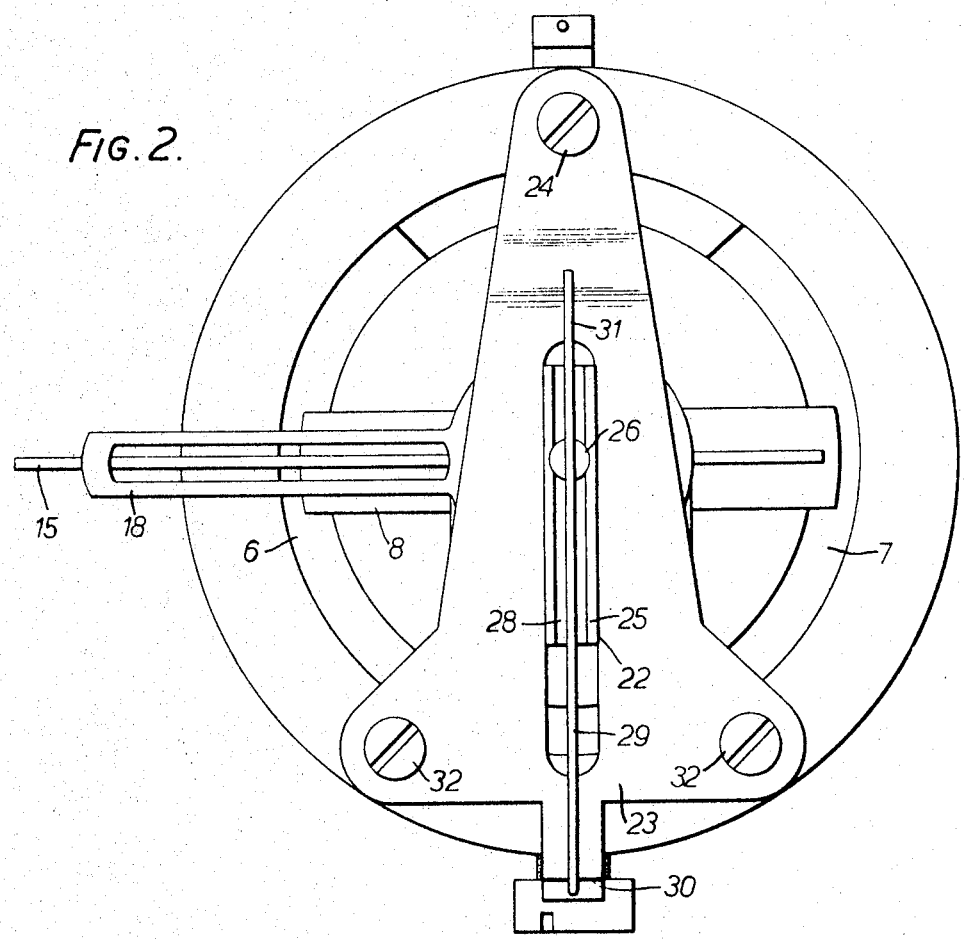
INVENTOR
Hugh Sutherland Macadie
BY
Baldwin & Wight
ATTORNEY 3,298,758
INSTRUMENT BEARINGS AND INSTRUMENTS INCORPORATING SUCH BEARINGS
Hugh Sutherland Macadie, Mill Hill, London, England, assignor to Avo Limited
Filed Apr. 29, 1964, Ser. No. 363,448
Claims priority, application Great Britain, May 3, 1963, 17,690/63
16 Claims. (Cl. 308—159)

This invention relates to instrument bearings and to instruments incorporating such bearings and is particularly although not exclusively applicable to bearings for use with electrical measuring instruments.

In such instruments it is desirable to provide a spring loaded type of bearing designed to limit the force which may be applied to the movement pivots under conditions of vibration or impact. Furthermore it is advantageous to space the bearing points as far apart as possible. This is preferably done by fitting external rather than internal pivots in those cases where choice applies, since apart from the greater axial length giving better pointer control, such pivots are easier to fit replace if necessary and to adjust for free action without excessive pointer rock. If conventional bearings are arranged externally of the spindle, in for example a moving coil electrical instrument, then they tend to unnecessarily increase the overall height of the instrument which is a disadvantage.

According to the present invention an instrument bearing in which a spindle can be supported comprises a bearing block means for slidably supporting the bearing block so that it can move in the direction of the axis of the spindle, and a leaf spring which can act to resiliently locate the bearing block axially in a direction away from the spindle.

Thus the axial position of the bearing block can vary very slightly under the resilient action of the spring if it is over adjusted during assembly or to accept shocks on the spindle when assembled. Usually the bearing block will be adjusted so that there is about one thousandth of an inch of axial play between the spindle and the bearings when assembled before reaction of the block occurs.

With this arrangement the only component outside the bearing block is the leaf spring, and as this can be made of small thickness it will be appreciated that even if the bearing block has receded under impact the overall height of the bearing is small in comparison with known assemblies. Moreover the bearing block itself is easily accessible for adjustment or for replacement fitting or exchange of pivots if necessary. A further advantage is that snubbing against shock or vibrations in all planes is easily achieved.

The bearing block may be of any convenient form but is preferably a Vee jewel.

Preferably the leaf spring is in the form of a resilient wire extending in a direction substantially normal to the axis of the spindle with which the bearing is to be used, and this resilient wire may be rigidly connected to the means for supporting the bearing block.

Control means may also be included to accurately control the operative position of the leaf spring, which may include a carrier which can act on the leaf spring and which is biased away from the spindle with which the bearing is to be used and adjustable means for fixing the position of the carrier, this in turn controlling the position of the leaf spring.

The means for fixing the position of the carrier may comprise an adjusting screw which acts on the carrier at a point remote from the position where the carrier is secured to the apparatus with which the bearing is to be used.

In a convenient arrangement the carrier itself is made in the form of a leaf spring which is biased away from the spindle, and which exerts a force greater than the leaf spring which acts on the bearing block.

The bearing block is preferably arranged to slide in a bore in a support element the axial position of which in relation to the spindle is fixed and this support element may be formed with a groove or bore at right angles to the bore in which the bearing block can slide and in which the leaf spring is located. This groove or bore therefore locates the wire spring in position beyond the bearing block and also provides a form of protection for the wire against inadvertent damage. The bore in the support element in which the bearing block can slide may also act to limit radial movement of an enlarged portion of a spindle with which the bearing is to be used to provide radial snubbing.

The spindle may carry a pivot pin which contacts the bearing block, this pin being supported in a bore in the enlarged portion of the spindle, and axial snubbing may be achieved by an enlarged portion of the spindle which can engage an abutment surface in, or adjacent to the bore in which the bearing block can slide.

The support element may also serve as a mount for a zero adjuster, together with its friction device.

Conveniently the support element extends through an opening in the carrier and one end of the leaf spring is rigidly connected to the carrier at a point remote from the adjusting means, the other end of the spring engaging the carrier where it emerges from the groove in the support element. The carrier may be provided with a projecting arm to which the leaf spring is rigidly connected and the force with which the resilient wire will act upon the bearing block when required can therefore be adjusted by bending the wire or alternatively the arm to which the wire is connected.

The invention also includes an instrument incorporating a bearing as set forth above.

The invention may be performed in various ways but one embodiment as applied to a moving coil electrical measuring instrument will now be described by way of example and with reference to the accompanying drawings in which:

FIGURE 1 is a cross-sectional side elevation of an instrument incorporating the invention, and, FIGURE 2 is a plan view of the instrument shown in FIGURE 1.

The instrument comprises an outer steel ring 1 inside which is arranged a cylindrical core magnet 2. The core magnet 2 is held in spaced relationship with the outer ring 1 by means of a pair of cheek pieces 3, 4 made from non-magnetic material which are arranged diametrically opposite one another in the annular gap between the core magnet 2 and the steel ring 1. Each of these cheek pieces 3, 4 projects from opposite end faces of the assembly and they are clamped in position by means of a clamping screw 5 which extends through the outer steel ring 1 and bears against one of the cheek pieces 3. Tightening of the screw 5 causes both cheek pieces 3, 4 and the magnetic core 2 to be clamped into the ring 1. The dimensions of the cheek pieces 3, 4 are made to an accuracy such that a pair of diametrically opposite annular gaps 6, 7 are provided between the magnetic core and the outer ring 1 in which the moving coil 8 can operate.

The moving coil 8 is shaped so that it extends across both end faces of the core magnet 2 and through each of the semi-angular gaps 6, 7. The coil is symmetrically spaced away from the ends of the magnetic core and is maintained for rotation around the core by means of a pair of bearings 9, 10, one on each end. A pivot holder 11 projects outwardly from the outer face on each end of the coil 8. Each of these pivot holders 11 is in the form of a tube on one end of which is provided a flange 12 which is secured to the coil, and from the other outer end of which projects a pointed steel pivot 13 which provides the spindle proper. This pin 13 is located in the tube and is provided at its free end with a pointed conical surface 14.

A pointer 15 is connected to the coil on one side, and a hair spring 16 is arranged to surround each of the spindles to provide the necessary control torque and electrical connections to the coil 8. A zero adjuster 17 intended for external operation and having a slotted extension 18 also provided on the same end of the core magnet as the pointer so that the zero position thereof can be adjusted.

A somewhat similar arrangement but without the extension 18 is also provided at the other side of the coil for coarse setting.

The mounting for the bearing which is to support each of the spindles is the same on both ends of the core magnet, and one end only will therefore be described. Secured to the upper end of the cheek piece 3 which projects beyond the core magnet 2 and the steel ring 1 is an assembly comprising a lower plate 20 which acts as a zero adjuster friction device which extends beyond the axis of the movement and is provided with an aperture 21 through which the spindle 13 extends, a support element 22 which is arranged above the lower plate 20 and also projects beyond the axis of the movement, and the details of which will be described, and a carrier 23 which is arranged above the support element 22 and which extends across the axis to a point on the outer ring 1 to which it is secured by an adjusting screw 24. The support element 22 is provided with a portion 25 which projects upwardly through an opening in the carrier 23 and is also provided with a bore 26 which is in axial alignment with the spindle 13. A Vee jewel 27 the depression of which receives the conical end 14 of the spindle 13 is arranged to slide within this bore 26, and a groove 28 is arranged along the upper surface of the support element 22 which intersects this bore 26 at right angles thereto. In order to retain the Vee jewel 27 in position a leaf spring in the form of a resilient wire 29 extends through the groove 28 in the support element and one end thereof is soldered to an arm 30 which projects outwardly from the carrier 23 on the side of the carrier which is secured to the cheek piece 3, and the other end 31 of the resilient wire 29 projects beyond the end of the groove 28 in the support element 22, and is in spring contact with the upper surface of the carrier 23 close to the point where it emerges from the groove. The resilient wire 29 can rest against the outer end of the Vee jewel 27 and can act to resiliently locate it axially in a direction away from the spindle 13, and the force with which the wire presses against the upper surface of the carrier 23 can be initially adjusted by bending the arm 30 to which it is soldered, or by bending the wire itself.

Thus, this setting controls the intensity of force with which the Vee jewel can act on the spindle should such force cause the spring to separate from the carrier and the axial position of the bearing block is set by means of the adjustable carrier 23.

The instrument is arranged with the axis of movement substantially vertical and correct adjustment of the coil position is facilitated if the lower spring 29 exerts a slightly greater force than the upper spring 29 on their corresponding carriers.

The carrier itself is formed from a sheet of resilient metal which is of substantially triangular shape, the base of the triangle being connected to the cheek piece by a pair of screws 32 which pass through not only the carrier but also the support element 22 and the lower plate 20 and which act to retain the whole of the assembly in position on the cheek piece 3. The other end of the triangular shaped carrier is provided with a slotted hole through which the adjusting screw 24 can pass and cooperate with a tapped hole in the steel outer ring 1. A locking nut 33 is provided on this adjusting screw 24, and the carrier is cranked at 34 and shaped so that it is resiliently biased away from the spindle. Thus axial movement of the adjusting screw 24 will act to fix the position of the carrier and therefore the leaf spring 29. The lower surface of the support element 22 is cut away to provide a projecting boss 35 around the bore 26 in which the Vee jewel 27 is mounted and in which the tube which provides the lower part of the spindle is also housed. The gap between the tube and the wall of the bore 26 is small, so that effective side-ways snubbing is provided. The gap between the lower plate 20 and the cut-away portion of the lower surface of the support element surrounding the boss is occupied by the zero adjuster 17, which is free to rotate to a certain degree, but tends to remain in its adjusted position due to the friction between the lower plate 20 and the support element 22, the lower plate being bent upwardly slightly to provide the required friction pressure. The hair springs 16 are attached to the zero adjusters 17 by means of insulated tags 36.

As will be seen the thickness of the bearing provided by the assembly is little more than the length of the Vee jewel 27 itself, and the invention thus provides a bearing for an externally pivoted movement of shorter axial length than heretofore.

I claim:

1. An instrument bearing in which a spindle can be supported comprising a bearing block, means for slidably supporting the bearing block so that it can move in the direction of the axis of the spindle, a leaf spring which can act to resiliently locate the bearing block axially in a direction toward the spindle, and a carrier to which said leaf spring is connected and which is adjustable to remove the biasing force of said leaf spring against said bearing block.

2. An instrument bearing as claimed in claim 1 in which the bearing block is in the form of a Vee jewel.

3. An instrument bearing as claimed in claim 1 in which the leaf spring is in the form of a resilient wire extending in a direction substantially normal to the axis of the spindle with which the bearing is to be used.

4. An instrument bearing as claimed in claim 3 provided with means for slidably supporting the bearing block, one end of the resilient wire being rigidly connected to such means.

5. An instrument bearing as claimed in claim 1 including control means for accurately controlling the operative position of the leaf spring in relation to the bearing block.

6. An instrument bearing as claimed in claim 5 in which the control means include a carrier member which acts on the leaf spring and which is biased away from the spindle with which the bearing is to be used, and adjustable means for fixing the position of the carrier.

7. An instrument bearing as claimed in claim 6 in which the means for fixing the position of the carrier comprises an adjusting screw which acts on the carrier at a point remote from a position where the carrier is secured to the apparatus with which the bearing is to be used.

8. An instrument bearing as claimed in claim 6 in which the carrier member is in the form of a leaf spring which is biased away from the spindle, and which exerts a force greater than the leaf spring which acts on the bearing block.

9. An instrument bearing as claimed in claim 1 provided with a support element having a bore in which the bearing block is arranged to slide, the axial position of which support element in relation to the spindle being fixed.

10. An instrument bearing as claimed in claim 9 in which the support element is formed with a groove at right angles to the bore in which the bearing block can slide, and in which groove the leaf spring is located.

11. An instrument bearing as claimed in claim 10 in which the support element extends through an opening in the carrier member and one end of the leaf spring is rigidly connected to the carrier at a point remote from the adjusting means, the other end of the spring engaging the carrier where it emerges from the groove in the support element.

12. An instrument bearing as claimed in claim 11 in which the carrier member is provided with a projecting arm to which the leaf spring is rigidly connected.

13. An instrument bearing as claimed in claim 9 in which the bore in the support element in which the bearing block can slide can also act to limit radial movement of an enlarged portion of a spindle with which the bearing is to be used to provide radial snubbing.

14. An instrument bearing as claimed in claim 13 in which the spindle carries a pivot pin which contacts the bearing block, this pin being supported in a bore in the enlarged portion of the spindle.

15. An instrument bearing as claimed in claim 9 in which radial snubbing of said spindle is achieved by an enlarged portion of the spindle which can engage an abutment surface forming a part of said support element.

16. An instrument bearing as claimed in claim 9 in which the support element serves as a mount for a zero adjuster, having a friction device.

References Cited by the Examiner
UNITED STATES PATENTS

| | | | |
|---|---|---|---|
| 2,396,462 | 3/1946 | Grace et al. | 308—159 |
| 2,901,298 | 8/1959 | Carpenter | 308—159 |

FOREIGN PATENTS

| | | |
|---|---|---|
| 485,879 | 6/1947 | Great Britain. |

MARTIN P. SCHWADRON, *Primary Examiner.*

FRANK SUSKO, *Examiner.*